United States Patent [19]

Ohta et al.

[11] 4,234,469

[45] Nov. 18, 1980

[54] FLAME RETARDING POLYOLEFIN RESIN BLEND COMPOSITION

[75] Inventors: Yuzo Ohta, Ichihara; Norio Sugi, Sodegauro; Osamu Isogai, Ichihara; Takahiro Hirai; Hidehiko Kaji, both of Sodegaura, all of Japan

[73] Assignee: Idemitsu Kosan Company Limited, Tokyo, Japan

[21] Appl. No.: 5,184

[22] Filed: Jan. 22, 1979

Related U.S. Application Data

[63] Continuation of Ser. No. 759,625, Jan. 17, 1977, abandoned.

[30] Foreign Application Priority Data

Jul. 29, 1976 [JP] Japan .................................. 53-89682

[51] Int. Cl.$^2$ ...................... C08L 23/06; C08L 23/12
[52] U.S. Cl. ........................ 260/42.46; 260/45.75 B; 525/240
[58] Field of Search ......... 260/897 A, 42.46, DIG. 24

[56] References Cited

U.S. PATENT DOCUMENTS

| | | | |
|---|---|---|---|
| 3,265,771 | 8/1966 | Ray et al. | 260/897 X |
| 3,331,797 | 7/1967 | Kopetz et al. | 260/28.5 |
| 3,340,123 | 9/1967 | Osmon | 260/897 X |
| 3,403,036 | 9/1968 | Hindersinn et al. | 106/18 |
| 3,668,155 | 6/1972 | Raley | 260/DIG. 24 |
| 3,668,281 | 6/1972 | Drake | 260/897 C |
| 3,720,643 | 3/1973 | Abu-Isa et al. | 260/41.5 A |
| 3,730,940 | 5/1973 | Uersnel et al. | 260/41 A |
| 3,835,091 | 9/1974 | Roos et al. | 260/42.45 |

FOREIGN PATENT DOCUMENTS

| | | | |
|---|---|---|---|
| 42-6254 | of 1967 | Japan | 260/42.46 |
| 49-37417 | 8/1974 | Japan | 260/42.46 |

*Primary Examiner*—Carman J. Seccuro
*Attorney, Agent, or Firm*—Frishauf, Holtz, Goodman & Woodward

[57] ABSTRACT

Flame retarded resin compositions are formed of specified quantities of polypropylene, polyethylene, inorganic filler and flame retarder such as an organic halide.

3 Claims, No Drawings

FLAME RETARDING POLYOLEFIN RESIN BLEND COMPOSITION

This application is a continuation of application Ser. No. 759,625 filed Jan. 17, 1977, now abandoned.

FIELD OF INVENTION

The present invention relates to a flame retarding resin composition. More particularly, it relates to a resin composition excellent in flame retardation consisting of polypropylene, polyethylene, inorganic filler and a flame retarder such as an orgainic halide, etc. mixed in a specific ratio.

BACKGROUND OF THE INVENTION

It has been generally known that a thermoplastic resin can be flame retarded by adding a flame retarder or flame retarder and flame retarding assistant such as an organic halide, organophosphorus compound, antimony oxide, etc., to the resin. However, by examining individual thermoplastic resins, it has been found that the attained degree of flame retardation is different for each resin due to the difference in its properties, and flame retardation is not necessarily attained in a state suitable to the utility of each resin. Among various types of resins, it is extremely difficult, especially with a polyolefin, to make it flame retarding and to maintain its good properties.

With regard to the attainment of flame retardation for a polyolefin, it is already known to be possible to some degree by adding the aforesaid flame retarder or flame retarder and flame retarding assistant. It is also general knowledge that talc is effective to prevent fusion dropping at combustion, which is possible to be a source for second ignition for a fire (Japanese Patent Publication Gazettes No. 32288/1972 and 6105/1972, Japanese Patent Gazette laid open to public 345/1974, etc.). On the other hand, the industries relying upon electrical machinery and appliances demand thin moldings of polyolefins because of their good electrical properties. In addition, burning resistance is lowered and fusion dropping at combustion occurs more easily as the moldings are made thinner. However, the aforesaid techniques cannot afford high flame retarding properties without fusion dropping in the case of thin moldings of polyolefins. Recently, a method for making a device in diffusion state of flame retarder as the measure for affording higher flame retarding properties to plastics, mainly polyolefins, was reported (Japanese Patent Gazettes laid open to public 14946/1976 and 39739/1976). According to this method, however, thermal hysteresis of extremely high temperature (higher than 290° C.) is caused at the time of manufacturing and it damages the properties of plastics. Therefore, this method is impractical for actual application.

As a consequence of studies made to develop compositions with high flame retarding properties without fusion dropping in thin moldings of polyolefins, while maintaining good properties of the polyolefins, we have found unexpectedly that by combining polypropylene with polyethylene at specific ratios, not only are physical properties maintained but also flame retarding properties are improved.

SUMMARY OF THE INVENTION

In accordance with the present invention, there is provided a flame retarding resin composition consisting essentially of 30 to 80% by weight of polypropylene, 5 to 25% by weight of polyethylene, 10 to 50% by weight of at least one inorganic filler selected from the group consisting of powdered talc, kaolinite, sericite, silica and diatomaceous earth, and a flame retarder, in which the amount of each component is based on the total amount of polypropylene, polyethylene and inorganic filler.

EMBODIMENTS OF THE INVENTION

Polypropylene constitutes the basis for the compositions of the present invention and determines the fundamental physical properties of the compositions. As the polypropylene, a copolymer of propylene and another olefin as well as a polymer of propylene can be used, but especially polypropylenes with from 0.5 to 15.0 grams per 10 minutes of melt index (temperature 230° C., load 2.16 kilograms) are preferred. The polypropylene should be blended in an amount of from 30 to 80% by weight, based on the total amount of polypropylene, polyethylene and inorganic filler.

Polyethylene used in the present invention enhances the impact strength of the compositions and at the same time improves burning resistance and shape-retainability at combustion. Especially, the polyethylene acts effectively to prevent fusion dropping. Therefore, the amount of flame retarder and flame retarding assistant can be reduced by adding polyethylene to the composition. As polyethylene, any low density-, middle density- or high density-polyethylene can be used, but especially polyethylenes with 0.01 to 2.0 grams per 10 minutes of melt index (temperature 190° C., load 2.16 kilograms) are preferred. The polyethylene should be blended in an amount of from 5 to 25% by weight, based on the total amount of polypropylene, polyethylene and inorganic filler. An amount of less than 5% by weight cannot exhibit the effect of preventing fusion dropping of the resulting moldings. On the other hand, an amount of more than 25% by weight is to be avoided because it cannot fully prevent fusion dropping of the resulting moldings and because lowering of molding ability, damage in appearance of the moldings, lowering of heat distortion temperature and lowering of rigidity are significant.

As inorganic fillers useful in the present invention, powdered talc, kaolinite, sericite, silica and diatomaceous earth can be used singly or in combination. Average particle size of the filler is preferred to be small, particularly less than $3\mu$ is further preferred. The inorganic filler serves to improve burning resistance and ridigity of the resulting moldings, to heighten the heat distortion temperature, to improve shape-retainability at combustion and to prevent fusion dropping effectively. Thus, the inorganic filler exhibits an action similar to that of the flame retarder or flame retarding assistant. Therefore, the amount of the flame retarder and flame retarding assistant can be reduced by the addition of such a filler. The amount of inorganic filler should be from 10 to 50% by weight, based on the total amount of polypropylene, polyethylene and inorganic filler. The improving effect on shape-retainability at combustion is insignificant with an amount of less than 10% by weight. On the contrary, an amount exceeding 50% by weight induces unfavorable phenomena such as an increase of density in the resulting molding, lowering of impact strength and molding ability.

In addition, the compositions of the present invention must contain a flame retarder in order to have high flame retarding properties. Although there is no particular limitation on the kind of flame retarder which can be used, organic halides are excellent in heat-resistance; typical of these are bromodiphenyl ether and dodecachlorododecahydrodimethanobenzocyclooctene are preferred. Chlorinated paraffins lower rigidity, heat distortion temperature and impact strength and consequently promotes fusion dropping at combustion. They also induce unfavorable phenomena such as lowering of thermal stability. When tetrabromobutane or hexabromobenzene is used, the range of temperature applicable is limited due to large volatility and there may be some inconvenience in manufacture or from the viewpoint of utility, although flame retarding properites can be obtained.

A flame retarder can be added in an amount corresponding to the required degree of flame retardation and there is no particular limitation; however, usually an amount of from 5 to 35% by weight, based on 100 parts by weight of the blend of polyporpylene, polyethylene and inorganic filler, is preferred. An amount of less than 5% by weight cannot afford sufficient flame retardation. In the case of more than 35% by weight, impact strength is significantly lowered and at the same time an expensive flame retarder added in a large quantity is unfavorable economically.

In the present invention, an antimony compound such as antimony trioxide, antimony trichloride, antimony trisulfide, etc., or a boron compound such as zinc borate, borax, etc., can be added as flame retarding assistant as needed. The amount of flame retarding assistant can be selected in accordance with the required degree of flame retardation, but it is usually preferred to be from ¼ to ½ of the amount of flame retarder. The action of the flame retarding assistant is synergistic with that of the flame retarder. Especially, in the industries relying upon electrical machinery and appliances where the products are used as thin moldings, a high degree of flame retardation is required. With materials having high mechanical strength, the use of such flame retarding assistant is useful. The addition of a flame retarding assistant can reduce the added amount of flame retarder.

The compositions of the present invention can also contain a coloring agent such as: a dyestuff, pigment, etc.; nucleation agent; lubricant; plasticizer; heat-resistance stabilizer; ultraviolet absorber; mold releasing agent; cross-linking agent; foaming agent, etc., according to the intended use of the compositions.

The process for molding the compositions is not critical. Usually, the aforementioned ingredients are put into a Banbury mixer, inter-mixer, or other type of mixer, in a specific ratio; then fused, and mixed while heating. The resulting mixture is made into a sheet with a mixing-roll and then made into a pellet with a pelletizer after being cooled and solidified. According to another process, each ingredient is continuously mixed with a conventional extruder or biaxial extruder, and subjected to a strand extrusion. Pellets are obtained by pelletizing the strand with a strand-cutter after being cooled and solidified. It is preferred to mold the said pellet after such a procedure to make the desired moldings.

Thus resulting moldings possess a high degree of flame retarding property and are excellent in shape-retainability at combustion, such that there is little occurrence of fusion dropping. In these moldings, sufficient flame retardation can be given even when a flame retarder is added in a small amount because the polyethylene and inorganic filler are added.

The compositions of the present invention with such properties can be utilized effectively as electrical insulation materials, closure materials for electrical and electronic products, materials for parts of cars, etc.

A typical illustrative example and a comparative example are shown below.

EXAMPLE AND COMPARATIVE EXAMPLE

Predetermined amounts of each of polypropylene, polyethylene, inorganic filler, flame retarder and antimony trioxide were put in a Banbury mixer heated at 150° C. (casing temperature) and were mixed therein. The resulting mixed composition was made into a sheet with a mixing-roll, and then made into a pellet with a pelletizer after being cooled and solidified.

Thus resulting pellets were subjected to injection molding at the highest cylinder temperature of 210° C. and mold temperature of 50° C. to give a piece A for a combustion test of 5 (inch)×½ (inch)×1/16 (inch) and a piece B of 5 (inch)×½ (inch)×1/32 (inch). The flame retarding properties were tested for each piece. The flame retarding test was performed according to UL subject 94 (Underwriters Laboratory Incorporation) "Combustion test on plastic materials for the parts of machinery and appliances" to check the classification of burning quality, presence or absence of fusion dropping, and ignition of cotton underlaid due to fusion dropping. The results are shown in Tables 1 and 2.

TABLE 1

| No. | Amount of Component (parts by weight) | | | | | Piece A | | Piece B | | Ignition of Cotton underlaid |
|---|---|---|---|---|---|---|---|---|---|---|
| | Polypropylene*1 | Polyethylene*2 | Inorganic filler*3 | Flame retarder*4 | Antimony trioxide | Classification of Burning Quality | Fusion Dropping | Classification of Burning Quality | Fusion Dropping | |
| Comparative Example 1 | 70 | 0 | 30 | 30 | 10 | — | — | V 0 | Yes | No |
| Example 1 | 60 | 10 | " | " | " | — | — | " | No | " |
| Example 2 | 50 | 20 | " | " | " | — | — | " | " | " |
| Comparative Example 2 | 40 | 30 | " | " | " | — | — | V 2 | Yes | Yes |
| Comparative Example 3 | 20 | 50 | " | " | " | — | — | " | " | " |
| Comparative Example 4 | 0 | 70 | " | " | " | — | — | " | " | " |
| Comparative Example 5 | 80 | 0 | 20 | 40 | 13 | — | — | " | " | " |
| Example 3 | 70 | 10 | " | " | " | — | — | V 0 | No | No |
| Example 4 | 60 | 20 | " | " | " | — | — | " | " | " |
| Comparative Example 6 | 40 | 40 | " | " | " | — | — | V 2 | Yes | Yes |

TABLE 1-continued

| | Amount of Component (parts by weight) | | | | | Piece A | | Piece B | | |
|---|---|---|---|---|---|---|---|---|---|---|
| No. | Poly-propylene*1 | Poly-ethylene*2 | Inorganic filler*3 | Flame retarder*4 | Antimony trioxide | Classification of Burning Quality | Fusion Dropping | Classification of Burning Quality | Fusion Dropping | Ignition of Cotton underlaid |
| Comparative Example 7 | 0 | 80 | " | " | " | — | — | " | " | " |
| Comparative Example 8 | 60 | 0 | 40 | 12 | 4 | V 0 | Yes | — | — | No |
| Example 5 | 50 | 10*5 | " | " | " | " | No | — | — | " |
| Example 6 | 40 | 20*5 | " | " | " | " | " | — | — | " |
| Comparative Example 9 | 20 | 40*5 | " | " | " | V 2 | Yes | — | — | Yes |
| Comparative Example 10 | 0 | 60*5 | " | " | " | " | " | — | — | " |
| Example 7 | 60 | 5/5*6 | 30 | 27 | 9 | — | — | V 0 | No | No |
| Example 8 | 55 | 7.5/7.5*6 | " | " | " | — | — | " | " | " |
| Example 9 | 60 | 10 | " | 20/10*7 | 10 | — | — | " | " | " |
| Example 10 | 60 | 10 | " | 10/20*7 | " | — | — | V 1 | " | " |

*1Density: 0.91 grams per cubic centimeter, Melt index: 9 grams per 10 minutes (Temperature 230° C., Load 2.16 Kilograms)
*2Density: 0.955 grams per cubic centimeter, Melt index: 0.05 grams per 10 minutes (Temperature 190° C., Load 2.16 kilograms)
*3Talc (Average particle size: 2.8 μ)
*4Decabromodiphenyl ether (Average particle size: 2.8 μ, Bromine percent) 83.48 percent)16 *5Density: 0.964 grams per cubic centimeter, Melt index: 0.4 grams per 10 minutes (Temperature 190° C., Load 2.16 kilograms)
*6Density: 0.919 grams per cubic centimeter, Melt index: 1.0 grams per 10 minutes (Temperature 190° C., Load 2.16 kilograms)
*7Dodecachlorododecahydrodimethanobenzocyclooctene (Average particle size: 3.0 μ, Chlorine content: 65 percent)

TABLE 2

| | Component | | | | | | | Piece B | | Ignition of Cotton underlaid | Appearance of Moldings |
|---|---|---|---|---|---|---|---|---|---|---|---|
| | Amount of Polypropylene (parts by weight)*1 | Amount of Polyethylene (parts by weight)*2 | Inorganic filler | | | Flame retarder (parts by weight)*3 | Antimony trioxide (parts by weight) | Classification of Burning Quality | Fusion Dropping | | |
| No. | | | Kind | Average particle size (μ) | Amount (parts by weight) | | | | | | |
| Example 11 | 60 | 10 | Kaolinite | 3.0 | 30 | 30 | 10 | V 0 | No | No | Good |
| Example 12 | " | " | Sericite | 2.6 | " | " | " | " | " | " | " |
| Example 13 | " | " | Silica | 1.8 | " | " | " | " | " | " | " |
| Example 14 | " | " | Diatomaceous earth | 4.1 | " | " | " | " | " | " | " |
| Comparative Example 11 | " | " | Heavy calcium carbonate | 3.0 | " | " | " | V 2 | Yes | Yes | " |
| Comparative Example 12 | " | " | Calcium sulfite | 7.0 | " | " | " | " | " | " | " |
| Comparative Example 13 | " | " | Calcined alumina | 5.3 | " | " | " | " | " | " | " |
| Comparative Example 14*4 | " | " | Aluminum hydroxide*5 | 5.0 | " | " | " | V 0 | No | No | Inferior (foamed) |
| Comparative Example 15*4 | " | " | Magnesium hydroxide | 7.2 | " | " | " | " | " | " | Inferior (foamed) |
| Comparative Example 16 | " | " | Calcium hydroxide | 6.3 | " | " | " | " | Yes | " | Inferior (coarse) |
| Comparative Example 17 | " | " | Calcium silicate | 7.9 | " | " | " | V 2 | " | Yes | Good |
| Comparative Example 18*4 | " | " | Basic Magnesium carbonate | 0.5 | " | " | " | V 0 | No | No | Inferior (foamed) |

*1Density: 0.91 grams per cubic centimeter, Melt index: 9 grams per 10 minutes (Temperature 230° C., Load 2.16 kilograms)
*2Density: 0.955 grams per cubic centimeter, Melt index: 0.05 grams per 10 minutes (Temperature 190° C., Load 2.16 kilograms)
*3Decabromodiphenyl ether (Average particle size: 2.8 μ, Bromine content: 83.48 percent)
*4No fusion dropping and good in flame retardation, but appearance of the moldings is inferior due to foaming at the time of molding.
*5Hydrated alumina having gibbsite crystalline structure

What is claimed is:

1. A composition consisting essentially of from 30 to 80 percent by weight of polypropylene having a melt index of from 0.5 to 15.0 grams per 10 minutes (temperature: 230° C., load: 2.16 kilograms), from 5 to 25 percent by weight of polyethylene having a melt index of from 0.01 to 2.0 grams per 10 minutes (temperature: 190° C., load: 2.16 kilograms), from 20 to 40 percent by weight of at least one inorganic filler selected from the group consisting of powdered talc, kaolinite, sericite, silica and diatomaceous earth, from 5 to 35 percent by weight of an organic halide flame retarder, and an inorganic antimony compound as a flame retarding assistant in an amount of from ¼ to ½ of the amount of said flame retarder, in which the amount of each component is based on the total amount of polypropylene, polyethylene and inorganic filler, said composition containing no chlorinated polyalkanes.

2. The composition of claim 1 wherein said inorganic antimony compound is antimony trioxide.

3. The composition of claim 1, wherein said organic halide is an organic halide selected from the group consisting of decabromodiphenyl ether, dodecachlorododecahydrodimethanobenzocyclooctene and mixtures thereof.

* * * * *